United States Patent [19]
Silva

[11] 3,820,365
[45] June 28, 1974

[54] AUTOMATIC EXTENSION CONTROL

[75] Inventor: Antonia Vicente Silva, Sao Paulo, Brazil

[73] Assignee: Westinghouse Electric Corporation, Pittsburgh, Pa.

[22] Filed: Mar. 23, 1973

[21] Appl. No.: 344,323

[52] U.S. Cl. .......................................... 72/8, 72/17
[51] Int. Cl. ............................................. B21b 37/00
[58] Field of Search ............................. 72/6–12, 17

[56] References Cited
UNITED STATES PATENTS

| | | | |
|---|---|---|---|
| 2,167,548 | 7/1939 | Hudson | 72/199 X |
| 2,519,818 | 8/1950 | Blain | 72/240 X |
| 2,982,158 | 5/1961 | Orbom | 72/9 |

Primary Examiner—Milton S. Mehr
Attorney, Agent, or Firm—J. J. Wood

[57] ABSTRACT

A rolling mill automatic control system made up of three subsystems in the form of (1) a mill stand roll force regulator; (2) a tension regulator; and (3) an extensiometer regulator. The roll force regulator controls the screwdown to maintain a constant roll force in the mill stand, or the first mill stand in a tandem mill arrangement. The tension regulator maintains constant delivery tension, or constant interstand tension in a two-stand mill arrangement. The extensiometer regulator introduces a change in the roll force reference value of the roll force regulator while at the same time, if desired, the extensiometer regulator delivers a corrective signal to the current regulator of the payoff reel or entry tension bridle if provided in the particular mill stand. The control circuit for the extensiometer regulator includes a divider block in either a digital or analog form to calculate the actual extension of the strip based on measured entry and delivery strip speeds.

12 Claims, 3 Drawing Figures

AUTOMATIC EXTENSION CONTROL

BACKGROUND OF THE INVENTION

Temper or skin pass rolling of strip is usually performed on a single or two-stand rolling mill arrangement which has extension control systems designed to compare the strip length before and after rolling. The objective in these rolling operations is to reduce the thickness of the strip by an amount whereby each incremental length of strip is elongated by the same amount. The corrective action to be taken by a screwdown, for example, is made on the basis of strip length measurements taken several feet before the strip enters the bite of the rolls and several feet after the strip leaves the bite of the rolls. The time required for an incremental length of strip after leaving the bite of the rolls to reach the length measuring device at the exit side of the mill is denoted as the transport time while the time required to measure the strip extension is usually referred to as the sensing time.

Conventional extension control systems are operated on the basis of a sample and hold principle to compensate for the transport time that elapses between the corrective action and the measurement of the results produced by this action. For this reason, the gain of the extension control system was dampened in the past in order to accommodate in succession both the transport time and sensing time needed to take sampled extension measurements and then make corrective adjustments to eliminate the deviations before the next sample measurement is taken.

SUMMARY OF THE INVENTION

In accordance with the invention, there is provided an automatic extension control system comprised of three subsystems all of which are concurrently operated for optimum extension control in a temper or skin pass mill, for example. The invention additionally contemplates the operation of each subsystem individually as selected by an operator. Specifically, the present invention provides an extension control system for a two-stand temper mill having three concurrently operative subsystems comprising a constant roll force regulator for the first rolling mill stand, a constant tension regulator for interstand tension between mill stands, and an extension regulator system based on the actual value of strip extension by the mill. The extension regulator system receives strip entry and delivery speed signals provided by generators coupled to strip contacting rollers at the entry and delivery sides of the mill. From these signals, the extension regulator system employs a digital or analog form of divider block for calculating the value of the actual strip extension according to the following expressions:

% Extension = $V_D - V_E/V_D \times 100$ percent, which can be rewritten by a rearrangement of terms as:

$$= (1 - V_E/V_D) \times 100 \text{ percent}$$

where
$V_D$ = the delivery speed of the strip from the mill; and $V_E$ = the entry speed of the strip to the mill.

The actual percent of strip extension is then compared with the desired strip extension as selected by the operator. The error represented by the difference between these two signals is then used to modify the roll force in stand No. 1 and bring the percent of strip extension back to the desired value. The invention additionally provides that the extension error control signal is introduced to a current regulator for the strip payoff reel at the same time that corrective action is being effected by the constant roll force regulator of the first mill stand. This allows an instantaneous correction to strip extension by changes to the tension in the strip before entering the mill while maintaining a constant level of roll force at the first rolling mill stand.

These features and advantages of the present invention as well as others will become more apparent when the following description is read in light of the accompanying drawings, in which.

Figure 1:
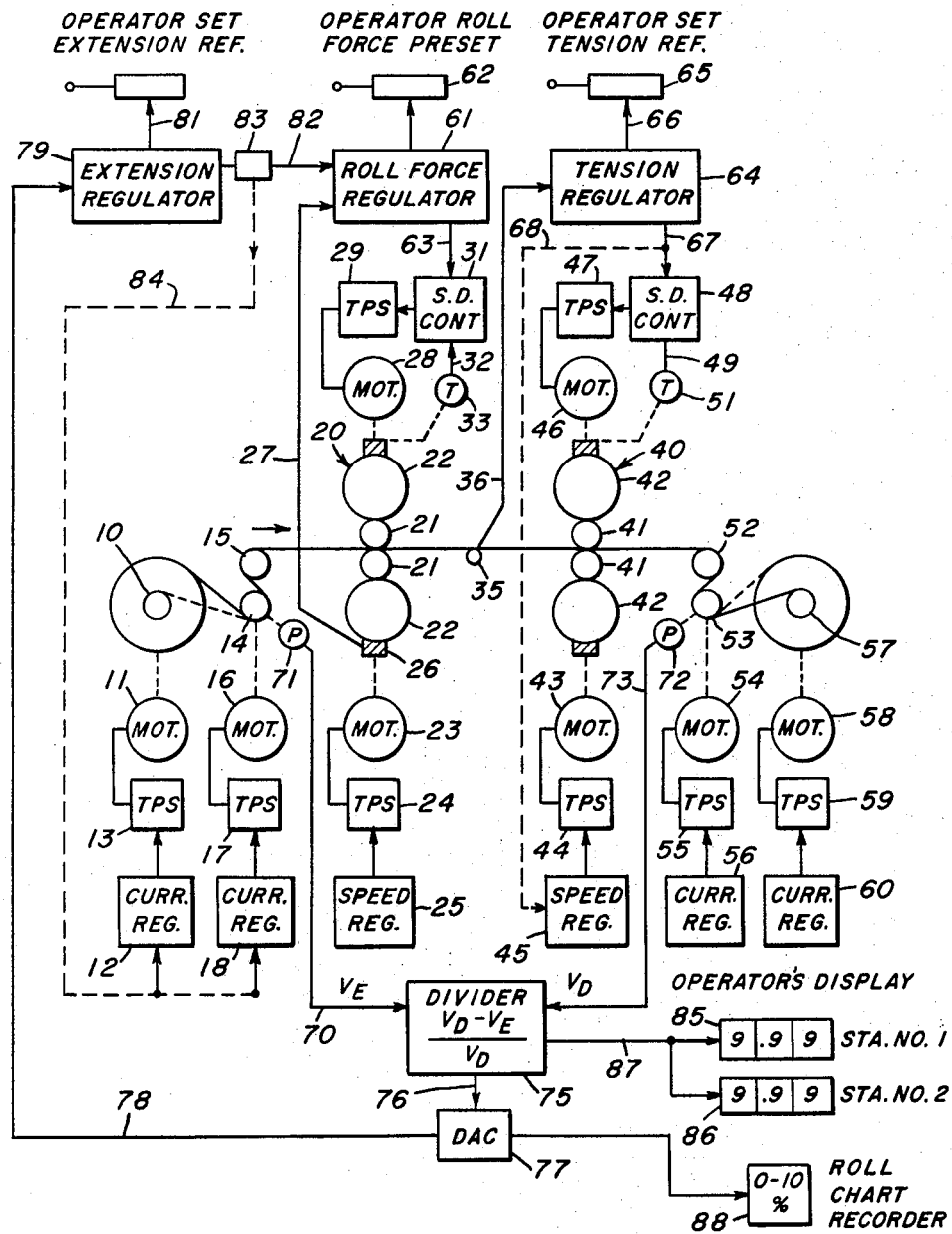
FIG. 1 is a schematic block diagram of an automatic extension control system for a two-stand temper rolling mill in accordance with the teachings of the present invention.

With reference now to the drawings, and particularly to FIG. 1, two-stand temper mill installation is schematically illustrated and includes a payoff reel 10 connected in driving relation with a direct current motor 11. A current control regulator 12 is connected to a thyristor power supply 13 for the motor 11 during the uncoiling of a strip S. The strip, after uncoiling, is fed into a tension roll bridle having a lower roll 14 and an upper roll 15. Roll 14 is connected to a motor 16 driven by a thyristor power supply 17 controlled from a current regulator 18.

The strip is then fed in the direction indicated by the arrow in FIG. 1 between work rolls 21, each of which are supported by a backup roll 22 forming part of the first mill stand 20 in the two-high tandem mill arrangement. The work rolls are driven by a motor 23 connected to a thyristor power supply 24. The power supply 24 is controlled by a speed regulator 25. A load cell 26 is arranged in the mill housing to provide a signal in line 27 representing the total rolling load between the work rolls in the mill. The roll gap between the work rolls 21 is controlled by providing the usual screwdown, not shown, driven by a motor 28 connected to a thyristor power supply 20 controlled by a screwdown controller 31. The screwdown controller 31 receives a screwdown position feedback signal in line 32 from a tachometer 33 connected to the screwdown. Other forms of roll gap adjusting apparatus may be employed in place of the screwdown such as a fluid-actuated piston and cylinder assembly controlled by a valve to deliver a constant rolling force.

The strip issuing from the first mill stand passes over a roller 35 of a tensiometer which provides a signal in line 36 proportional to the tension in the strip between the first mill stand 20 and a second mill stand 40. The second mill stand includes a pair of work rolls 41, each supported by a backup roll 42. The work rolls 41 are driven by a motor 43 having a thyristor power supply 44 controlled by a speed regulator 45. The second mill stand 40 includes the usual screwdown, not shown, for adjusting the gap between the work rolls. The screwdown is driven by a motor 46 having a thyristor power supply 47 connected to a screwdown controller 48. The screwdown controller receives a position feedback signal in line 49 fed through a tachometer 51 connected to the screwdown controller 48. Spaced from the delivery side of the mill stand 40 there is arranged a delivery tension bridle which includes an upper roller 52 and a lower roller 53. The tension bridle rollers are driven by a motor 54 connected to a thyristor power supply 55 controlled by a current regulator 56. The strip issuing from the tension bridle is then formed into a coil by a reel 57. The reel 57 is driven by a motor 58 having a thyristor power supply 59 connected to a current regulator 60.

In the operation of the two-stand temper mill illustrated in FIG. 1, the first mill stand 20 is controlled to provide a constant roll force at the gap of the work rolls 21. For this purpose, the rolling load signal in line 27 is fed to a roll force regulator 61 which also receives a desired roll force preset signal from an operator adjusted potentiometer 62. In order to maintain a constant roll force in mill stand 20, should there occur a deviation between the actual and desired rolling force signals, the regulator 61 produces a roll force error control signal in line 63. This error signal actuates the screwdown controller 31 which, in turn, controls the power supply 29 to the screwdown motor 28 to adjust the roll gap in a manner to maintain the desired constant roll force. This constant roll force control system forms the first of three subsystems according to the present invention to provide the automatic extension control. The second subsystem in this control is provided by maintaining a constant interstand tension between the mill stand 20 and the mill stand 40. For this purpose, the tension error signal provided by the tensiometer 35 in line 36 is connected to a tension regulator 64. Regulator 64 also receives an operator-set tension reference signal from a manually adjusted potentiometer 65 along line 66. The tension regulator 64 provides a tension error signal in line 67 which is connected to the screwdown control 48 of the mill stand 40. The screwdown controller being connected to the power supply 47 produces an adjustment by the motor 46 in the screwdown to change the gap between the work rolls. Should it be desired to maintain a preselected screwdown setting in the mill stand 40 due to, for example, problems relating to flatness and crown of the strip delivered from this mill stand, then as an alternative to the screwdown adjustment of this stand, constant tension can be maintained by connecting the tension regulator 64 by a line 68 to the speed regulator 45 for the power supply 44 of the work roll drive motor 43.

An extension regulator defines the third subsystem in the automatic extension control system according to the present invention. This system includes a strip entry speed signal $V_E$ in line 70 delivered from a selsyn transmitter 71 which, in turn, is mechanically connected to the bridle roll 14. A strip delivery speed signal $V_D$ is provided by a selsyn transmitter 72 mechanically connected to the delivery bridle roll 53. The signal provided by the transmitter 72 in line 73 is connected to a divider block 75. The divider block 75 has the function of calculating the value of the strip extension from the measured speeds $V_D$ and $V_E$ where:

$V_D$ = the velocity of the strip delivered from the second mill stand; and $V_E$ = the velocity of the strip entering the first mill stand.

The actual strip extension is calculated from the expression:

$$V_D - V_E/V_D \times 100\% = \text{percent of extension.}$$

The actual percent of strip elongation is determined according to this invention by an analog elongation calculator as one form of divider circuitry and in its second form a digital elongation calculator may be employed. These two forms of divider circuitry will be described in greater detail hereinafter.

The actual percent of strip extension after calculation, is in the form of either a digital or analog signal which is delivered by line 76 to a converter 77. When a digital calculator is employed, converter 77 takes the form of a digital-to-analog converter to provide an analog signal in line 78 proportional to the actual percent of strip extension. Line 78 is connected to an extension regulator 79 which also receives the signal in line 81 from a potentiometer which is manually set by an operator to represent the desired percent of strip extension. The output from regulator 79 is an error signal in line 82 connected to the roll force regulator 61 for the mill stand 20. This error signal is employed to modify the roll force in this mill stand and bring the percent of extension to the desired value. It should be noted that by modifying the roll force in the first mill stand, that the extension control system is actually modifying the mill entry speed $V_E$ without affecting the delivery speed $V_D$ at the exit side of the second mill stand. Moreover, the entry speed is instantaneously modified as soon as the reduction in stand No. 1 is changed. This produces an instantaneous change in the value of the extension as indicated by the expression given above. Thus, the automatic extension control operates on a continuous basis without the need for a sampling and hold principle type of operation.

Since the extensiometer regulator error signal produces, in effect, changes to the roll force reference for stand No. 1, it is possible to change the control system to inherently protect this mill stand from excessive roll forces. This is accomplished by the use of an error signal limiter 83 in line 82 for limiting the maximum signal value that the extensiometer regulator can feed to the roll force regulator system. Under these conditions, the extensiometer regulator error signal is also delivered from limiter 83 along line 84 to the current regulators 12 and 18 for the reel drive motor 11 and bridle drive motor 16, respectively. These current regulators function to control the tension in the strip before entering mill stand 20. The actual value of the strip extension produced by the temper mill can be displayed by an operator's readout digital display. This is shown in FIG. 1 by a digital display 85 for rolling mill stand No. 1 and a digital display 86 for rolling mill stand No. 2. The display signals are provided by a control signal along line 87 from the divider 75. A roll chart recorder 88 connected to the digital-to-analog converter 77 produces a continuous record of the strip elongation in the temper mill.

Figure 2:
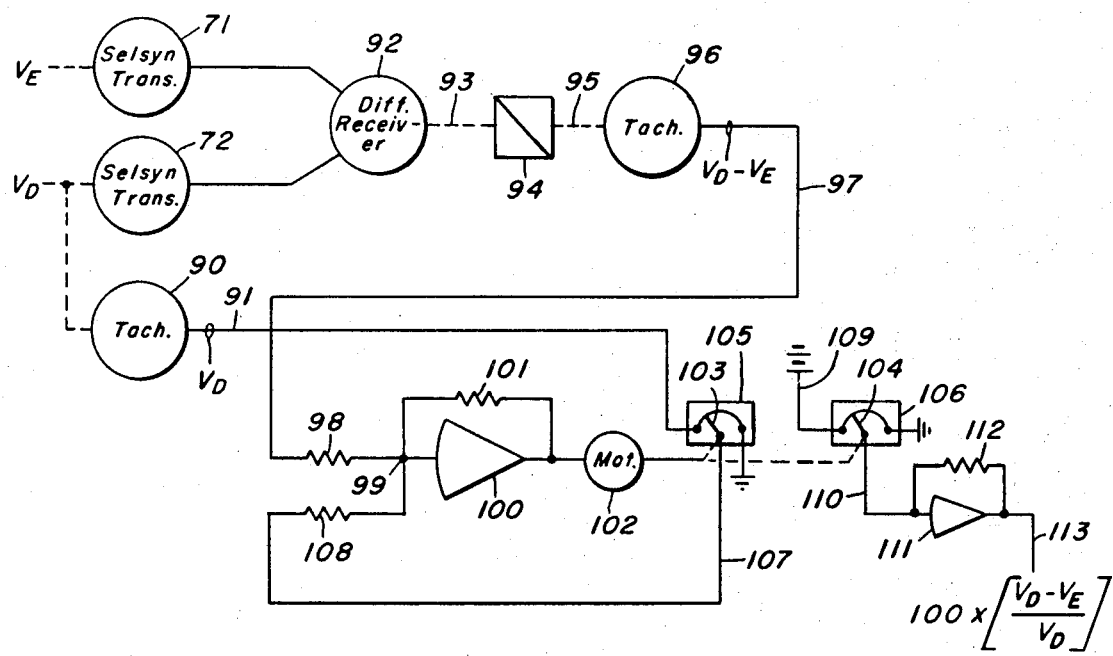
FIG. 2 is a detailed schematic circuit diagram of one embodiment of a divider block in the form of an analog elongation calculator.

FIG. 2 illustrates an analog form of the divider 75 for calculating the actual percent of strip elongation produced by the temper mill. The strip entry velocity $V_E$ is provided by the selsyn transmitter 71 driven by the roll 14 of the entry tension bridle. The strip delivery velocity $V_D$ is provided by the selsyn transmitter 72 driven by roll 53 of the delivery tension bridle. Tachometer 90 is also mechanically coupled to the roller 53 to provide a signal in line 91 proportional to the velocity of the strip delivered from the mill $V_D$. The output signals from the selsyn transmitters 71 and 72 are connected to a differential selsyn receiver 92 having an output shaft 93. Rotation of this shaft is proportional to and represents the actual difference between the delivery and entry speeds of the strip in the temper mill, i.e., $V_D - V_E$. Since these two speeds are nearly the same, the shaft 93 will rotate slowly but its speed very accurately represents the difference between $V_D$ and $V_E$. A speed-up gear drive 94 is connected to the shaft 93. An output shaft 95 from the speed-up drive 94 represents a mechanical amplification of the slowly rotating shaft 93. Shaft 95 is coupled to a tachometer 96 which delivers an output voltage in line 97 proportional to the quantity $V_D - V_E$. Line 97 is connected through a resistor 98 to a summing point 99. Point 99 is connected to a proportional operational amplifier 100 having a feedback path including a resistor 101. The output signal from amplifier 100 operates a motor 102 which is mechanically coupled to movable taps 103 and 104 of potentiometers 105 and 106, respectively. The signal $V_D$ in line 91 is applied to one side of the potentiometer 105. The other tap of potentiometer 105 is connected to ground. The motor driven tap 103 has a line 107 that forms a feedback path which includes a resistor 108 connected to point 99. A constant voltage supply is connected by line 109 to one tap of potentiometer 106 while the electrically opposed tap is connected to ground. The movable tap 104 provides a signal in line 110 connected to a proportional operational amplifier 111 having a feedback path including resistor 112. The output from amplifier 111 is a signal in line 113 proportional to the quantity $$100\% \times V_D - V_E/V_D$$

and represents the actual percent of strip elongation due to temper rolling in the mill. Since the signal in line 113 is in an analog form, it is directly connected to line 78 shown in FIG. 1.

Figure 3:
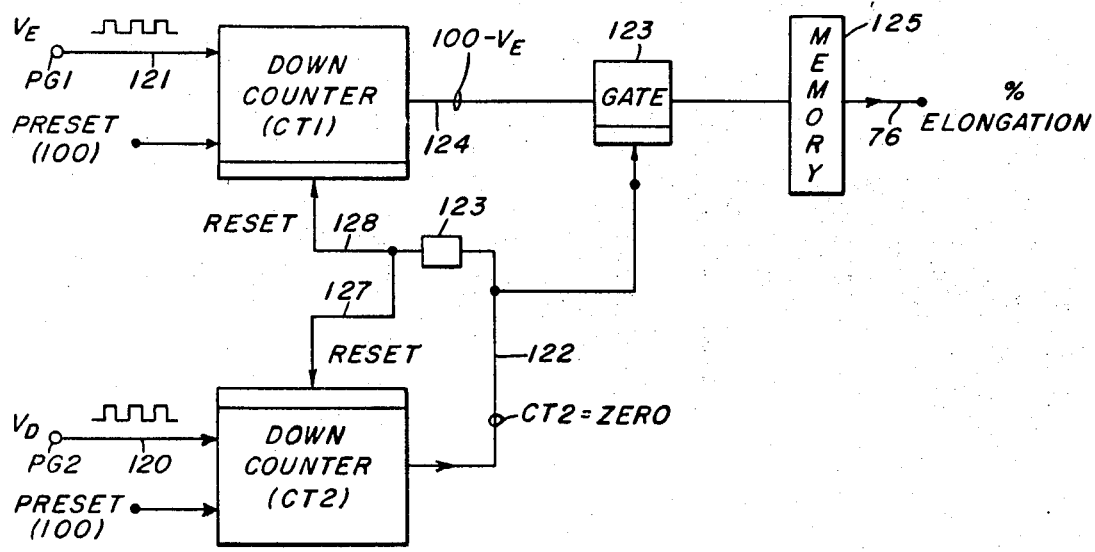
FIG. 3 is a detailed schematic circuit diagram of another embodiment of a divider block in the form of a digital elongation calculator.

FIG. 3 illustrates a digital form of divider for calculating the percent of elongation of strip processed in the temper mill. A pulse generator PG1 is mechanically coupled to the roll 14 of the entry tension bridle and a pulse generator PG2 is mechanically coupled to the roll 53 of the delivery tension bridle. The pulse generators PG1 and PG2 are constructed and arranged in such a way that the number of pulses per length of strip passing a given point on the rolls 14 and 53 is the same for both pulse generators. The pulses provided by generator PG2 are delivered by line 120 to a pulse counter CT2. This counter is preset to a fixed number of pulses, for example, 100. The pulses provided by generator PG1 are delivered by line 121 to a pulse counter CT1 which is preset to count the same number of pulses as pulse counter CT2.

As the rolling of strip in the temper mill takes place, both pulse counters CT1 and CT2 will subtract pulses from the preset number which, in the given example, was selected at 100 pulses. Since the delivery speed $V_D$ will always be higher than the entry speed $V_E$, the pulse counter CT2 will reach zero before pulse counter CT1 which occurs when generator PG2 has produced 100 pulses. Let it be assumed that when generator PG2 produces 100 pulses, generator PG1 has produced 95 pulses. In this event, when counter CT2 reaches zero, counter CT1 will have an output equal to 100 − 95 = 5 counts and this number of counts is exactly equal to the percentage of strip elongation due to temper rolling. When counter CT2 reaches zero, an output signal is delivered by line 122 for operation of a gate circuit 123 to open it and allow the output from counter CT1 to be transferred by line 124 through the gate and into a pulse count memory buffer 125. After the memory buffer 125 has received a predetermined number of strip elongation counts, a signal is transmitted by line 76 to the converter 77 as illustrated and described with respect to FIG. 1.

The pulse counter signal in line 122 is connected through a time delay 126 to lines 127 and 128 for resetting the counters CT1 and CT2 to their preset count value which, in the example given above, was selected at 100. The digital-to-analog calculator illustrated in FIG. 3 when compared with the analog elongation calculator illustrated in FIG. 2, has the advantage of being completely static. Moreover, the digital form of elongation calculator can be constructed and operated with an accuracy that is selectable and extremely high.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In the method of controlling the extension of strip material by regulating both the roll gap of a rolling mill and the tension in the strip material during rolling, the steps of:
   controlling said roll gap to produce a constant rolling force upon said strip material;
   controlling the tension in the strip material issuing from said roll gap for maintaining a predetermined constant strip tension;
   measuring the entry speed of the strip material issuing into said rolling mill and producing a signal proportional to the actual strip entry speed;
   measuring the delivery speed of the strip material issuing from said rolling mill and producing a signal proportional to the actual strip delivery speed;
   comparing said actual delivery speed signal and said actual entry speed signal with a desired strip extension signal to derive a strip extension deviation signal; and
   modifying said entry speed of the strip material as a function of said strip extension deviation signal by regulating said constant rolling force.

2. The method of claim 1 wherein said delivery speed signal and said entry speed signal are combined to derive an actual strip extension signal according to the expression $$V_D - V_E/V_D$$

where
   $V_D =$ the velocity of the strip issuing from said rolling mill; and
   $V_E =$ the velocity of the strip issuing to said rolling mill.

3. The method of claim 1 including the step of modifying the tension in the strip entering said rolling mill as a function of said strip extension deviation signal.

4. The method of claim 3 wherein said regulating of the constant rolling force is limited to adjustments within a predetermined range.

5. The method of claim 4 wherein said constant tension in the strip material issuing from the roll gap is controlled by modifying the screwdown setting of a rolling mill stand tandemly arranged to receive strip delivered from said roll gap.

6. The method of claim 4 wherein said constant tension in the strip material issuing from the roll gap is controlled by modifying the rolling speed of a rolling mill stand tandemly arranged to receive strip delivered from said roll gap.

7. An automatic extension control system for a rolling mill of the type formed by a plurality of control subsystems, said rolling mill including strip feeding means for delivering strip to a rolling mill stand which further includes an adjustable roll gap formed by a pair of driven strip processing rolls, said rolling mill additionally including strip tension means at the delivery side of said processing rolls, said extension control comprising:

means for generating a first signal proportional to the rolling force developed between said processing rolls;
a first control subsystem including regulator means receiving said first signal for adjusting said roll gap to maintain a constant rolling force in said mill stand;
means for generating a second signal proportional to the tension in the strip at the delivery side of said mill stand;
a second control subsystem including regulator means receiving said second signal for adjusting said strip tension means to maintain a constant strip tension at the delivery side of said mill stand;

means for generating a third signal proportional to the speed of the strip material issuing to said roll gap;
means for generating a fourth signal proportional to the speed of the strip material at the delivery side of said processing rolls;
means receiving said third and fourth signals for generating a fifth signal proportional to the actual extension of strip material by said mill stand; and
a third control subsystem including regulator means receiving said fifth signal and generating an extension error signal for varying the speed of the strip material entering said roll gap.

8. A control system according to claim 7 wherein said regulating means of said third control subsystem modifies said regulator means for adjusting said roll gap.

9. A control system according to claim 8 further comprising strip tensioning means at the entry side of said mill stand receiving said extension error signal for varying the speed of the strip material issuing to said roll gap.

10. A control system according to claim 9 wherein said strip tensioning means at the delivery side of said processing rolls includes a rolling mill stand arranged in tandem to process strip delivered from said processing rolls.

11. A control system according to claim 10 further comprising a differential selsyn receiver, said third and fourth signal generating means each including a selsyn transmitter connected to said differential selsyn receiver;

amplifier means receiving the output of said differential selsyn receiver for producing a sixth signal proportional to the difference between said fourth and third signals;
a divider block including a proportional operational amplifier receiving said fourth and sixth signals for producing said fifth signal proportional to the actual strip extension by the rolling mill;
means for generating a signal proportional to the desired strip extension; and
said regulating means of said third control subsystem producing said extension error signal by combining said signals proportional to the actual and desired strip extensions.

12. A control system according to claim 10 further comprising:
a pulse count memory buffer;
said third and fourth signal generating means each including a pulse generator connected to a pulse counter, each of said pulse counters having a preset for counting a like number of pulses;
gate means responsive to a preselected count by said fourth signal pulse counter for transferring the pulse count by said third signal pulse counter to said memory buffer;
a converter connected to said buffer for producing said fifth signal proportional to the actual strip extension by the rolling mill;
means for generating a signal proportional to the desired strip extension; and
said regulating means of said third control subsystem producing said extension error signal by combining said signals proportional to the actual and desired strip extensions.

* * * * *